(12) United States Patent
Kuo et al.

(10) Patent No.: US 8,545,081 B2
(45) Date of Patent: Oct. 1, 2013

(54) EDGE-LIT BACKLIGHT DEVICE AND LIQUID CRYSTAL DISPLAY

(75) Inventors: Yi-Cheng Kuo, Shenzhen (CN); Gege Zhou, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 71 days.

(21) Appl. No.: 13/318,357

(22) PCT Filed: Jun. 22, 2011

(86) PCT No.: PCT/CN2011/076152
§ 371 (c)(1),
(2), (4) Date: Oct. 31, 2011

(87) PCT Pub. No.: WO2012/142791
PCT Pub. Date: Oct. 26, 2012

(65) Prior Publication Data
US 2012/0268691 A1  Oct. 25, 2012

(30) Foreign Application Priority Data

Apr. 21, 2011 (CN) .................... 2011 2 0119846 U

(51) Int. Cl.
| | |
|---|---|
| F21V 7/04 | (2006.01) |
| F21V 15/00 | (2006.01) |
| G09F 13/04 | (2006.01) |
| G02F 1/1335 | (2006.01) |

(52) U.S. Cl.
USPC ........... 362/607; 362/628; 362/616; 362/362; 362/97.2; 349/65; 385/901

(58) Field of Classification Search
USPC ............... 362/561, 612, 97.2, 97.3, 613, 616, 362/628, 580, 218, 373, 362; 385/146, 901; 349/65, 69, 67, 161
See application file for complete search history.

(56) References Cited

U.S. PATENT DOCUMENTS

| | | | | |
|---|---|---|---|---|
| 4,746,179 | A * | 5/1988 | Dahne et al. | 385/12 |
| 5,202,950 | A * | 4/1993 | Arego et al. | 385/146 |
| 6,927,812 | B2 * | 8/2005 | Cho | 349/65 |
| 7,273,310 | B2 * | 9/2007 | Chen | 362/580 |
| 7,311,431 | B2 * | 12/2007 | Chew et al. | 362/613 |
| 7,338,194 | B2 * | 3/2008 | Chen | 362/560 |
| 7,379,291 | B2 * | 5/2008 | Quazi | 361/674 |
| 7,766,534 | B2 * | 8/2010 | Iwasaki | 362/632 |
| 7,878,686 | B2 * | 2/2011 | Suehiro et al. | 362/294 |
| 7,905,646 | B2 * | 3/2011 | Adachi et al. | 362/601 |
| 8,075,150 | B2 * | 12/2011 | Maruyama | 362/97.1 |
| 8,206,000 | B2 * | 6/2012 | Tung et al. | 362/97.1 |
| 2007/0081344 | A1 * | 4/2007 | Cappaert et al. | 362/373 |
| 2012/0195043 | A1 * | 8/2012 | Watanabe et al. | 362/249.02 |

* cited by examiner

*Primary Examiner* — Diane Lee
*Assistant Examiner* — Kenny C Sokolowski
(74) *Attorney, Agent, or Firm* — Cheng-Ju Chiang

(57) ABSTRACT

An edge-lit backlight device is disclosed in the present disclosure. The edge-lit backlight device comprises a light guide plate, light sources and a backplate. The light guide plate comprises two wedged plate portions and a rectangular plate portion, the two wedged plate portions are disposed at two sides of the rectangular plate portion respectively, and the wedged plate portions and the rectangular plate portion each comprise a light incident surface and a bottom surface. The light sources are disposed adjacent to the light incident surfaces of the wedged plate portions and the rectangular plate portion respectively. A liquid crystal display (LCD) is also disclosed in the present disclosure. The edge-lit backlight device and the LCD of the present disclosure are simple in structure, allow for regional control functions and can dissipate heat generated by the light sources in a timely and efficient way.

18 Claims, 4 Drawing Sheets

EDGE-LIT BACKLIGHT DEVICE AND LIQUID CRYSTAL DISPLAY

FIELD OF THE INVENTION

The present disclosure generally relates to the technical field of liquid crystal displays (LCDs), and more particularly, to an edge-lit backlight device for an LCD and the LCD.

BACKGROUND OF THE INVENTION

Liquid crystal displays (LCDs) are a kind of flat panel display device that utilizes liquid crystals to display images. Because of their advantages over other display devices such as lighter weight, thinner profile, lower driving voltage and lower power consumption, the LCDs have found wide application in the industries. However, because liquid crystal panels of the LCDs are unable to emit light by themselves, a light source device such as a backlight device must be provided in each of the LCDs.

In use of a backlight device currently available, a remarkable temperature rise can be found near the light source. The temperature rise not only degrades the light emission efficiency of the light source, but also leads to a nonuniform temperature distribution in the LCD which uses the light source to provide back light. The higher temperature of the LCD near the light source also leads to a reddish color, which has an adverse effect on the imaging quality of the liquid crystal panel. Moreover, the temperature rise of the light source also shortens the service life of the light source itself significantly.

SUMMARY OF THE INVENTION

An objective of one embodiment of the present disclosure is to provide an edge-lit backlight device and a liquid crystal display (LCD) which can solve the problem caused by the temperature rise of the light source.

To achieve the aforesaid objective, the present disclosure provides an edge-lit backlight device, which comprises a light guide plate, light sources and a backplate. The light guide plate comprises two wedged plate portions and a rectangular plate portion, the two wedged plate portions are disposed at two sides of the rectangular plate portion respectively, and the wedged plate portions and the rectangular plate portion each comprise a light incident surface and a bottom surface. The light sources are disposed adjacent to the light incident surfaces of the wedged plate portions and the rectangular plate portion respectively. The backplate comprises an inner surface and an outer surface. Two protrusions spaced apart from each other protrude from a bottom of the backplate at locations corresponding to the wedged plate portions, and a recessed region is defined below each of the protrusions. A rectangular groove and two wedged grooves disposed at two sides of the rectangular groove respectively are formed at an inner side of the backplate, and the wedged plate portions and the rectangular plate portion are disposed in the two wedged grooves and the rectangular groove respectively. The edge-lit backlight device further comprises heat dissipating elements disposed in the recessed regions respectively, and the heat dissipating elements and the light guide plate are located at two opposite sides of the backplate respectively.

According to a preferred embodiment of the present disclosure, each of the heat dissipating elements is a plurality of heat dissipating fins disposed apart from each other on the outer surface of the backplate adjacent to one of the recessed regions, the outer surface of the backplate is an inclined surface, and the heat dissipating fins extend from the outer surface downwards to be flush with the bottom surface of the rectangular plate portion.

According to a preferred embodiment of the present disclosure, each of the heat dissipating elements is a heat pipe disposed near the outer surface of the backplate and adjacent to the light incident surface of the rectangular plate portion.

To achieve the aforesaid objective, the present disclosure provides an edge-lit backlight device, comprising a light guide plate, light sources and a backplate. The light guide plate comprises two wedged plate portions and a rectangular plate portion, the two wedged plate portions are disposed at two sides of the rectangular plate portion respectively, and the wedged plate portions and the rectangular plate portion each comprise a light incident surface and a bottom surface. The light sources are disposed adjacent to the light incident surfaces of the wedged plate portions and the rectangular plate portion respectively. The backplate is disposed at an exterior side of the light guide plate and comprises an inner surface and an outer surface. The edge-lit backlight device further comprises heat dissipating elements, and the heat dissipating elements and the light guide plate are located at two opposite sides of the backplate respectively.

According to a preferred embodiment of the present disclosure, two protrusions spaced apart from each other protrude from a bottom of the backplate at locations corresponding to the wedged plate portions, and a recessed region is defined below each of the protrusions.

According to a preferred embodiment of the present disclosure, each of the heat dissipating elements is a plurality of heat dissipating fins disposed apart from each other on the outer surface of the backplate adjacent to one of the recessed regions, the outer surface of the backplate is an inclined surface, and the heat dissipating fins extend from the outer surface downwards to be flush with the bottom surface of the rectangular plate portion.

According to a preferred embodiment of the present disclosure, the heat dissipating fins are formed integrally on each of the protrusions of the backplate and are bent upwards and downwards into a wavy form.

According to a preferred embodiment of the present disclosure, each of the heat dissipating elements is a heat dissipating layer filled in one of the recessed regions, and a thickness of the heat dissipating layer decreases as a distance from the light incident surface of the rectangular plate portion increases.

According to a preferred embodiment of the present disclosure, each of the heat dissipating elements is a fan disposed near the outer surface of the backplate and adjacent to the light incident surface of the rectangular plate portion.

According to a preferred embodiment of the present disclosure, each of the heat dissipating elements is a heat pipe disposed near the outer surface of the backplate and adjacent to the light incident surface of the rectangular plate portion.

To achieve the aforesaid objective, the present disclosure provides a liquid crystal display (LCD), which comprises an edge-lit backlight device. The edge-lit backlight device comprises a light guide plate, light sources and a backplate. The light guide plate comprises two wedged plate portions and a rectangular plate portion, the two wedged plate portions are disposed at two sides of the rectangular plate portion respectively, and the wedged plate portions and the rectangular plate portion each comprise a light incident surface and a bottom surface. The light sources are disposed adjacent to the light incident surfaces of the wedged plate portions and the rectangular plate portion respectively. The backplate is disposed at an exterior side of the light guide plate and comprises an inner surface and an outer surface. The edge-lit backlight device further comprises heat dissipating elements, and the heat dissipating elements and the light guide plate are located at two opposite sides of the backplate respectively.

According to a preferred embodiment of the present disclosure, two protrusions spaced apart from each other protrude from a bottom of the backplate at locations corresponding to the wedged plate portions, and a recessed region is defined below each of the protrusions.

According to a preferred embodiment of the present disclosure, each of the heat dissipating elements is a plurality of heat dissipating fins disposed apart from each other on the outer surface of the backplate adjacent to one of the recessed regions, the outer surface of the backplate is an inclined surface, and the heat dissipating fins extend from the outer surface downwards to be flush with the bottom surface of the rectangular plate portion.

According to a preferred embodiment of the present disclosure, the heat dissipating fins are arranged in a direction parallel to a light emitting direction of a corresponding one of the light sources.

According to a preferred embodiment of the present disclosure, the heat dissipating fins are formed integrally on each of the protrusions of the backplate and are bent upwards and downwards into a wavy form.

According to a preferred embodiment of the present disclosure, each of the heat dissipating elements is a heat dissipating layer filled in one of the recessed regions, and a thickness of the heat dissipating layer decreases as a distance from the light incident surface of the rectangular plate portion increases.

According to a preferred embodiment of the present disclosure, the heat dissipating layer is wedge-shaped.

According to a preferred embodiment of the present disclosure, each of the heat dissipating elements is a fan disposed near the outer surface of the backplate and adjacent to the light incident surface of the rectangular plate portion.

According to a preferred embodiment of the present disclosure, each of the heat dissipating elements is a heat pipe disposed near the outer surface of the backplate and adjacent to the light incident surface of the rectangular plate portion.

According to a preferred embodiment of the present disclosure, the light sources include a plurality of light emitting diodes (LEDs).

The present disclosure has the following benefits: as compared to the prior art, the edge-lit backlight device and the LCD are simple in structure, allow for regional control functions and can dissipate heat generated by the light sources in a timely and efficient way. This prolongs the service life of the light sources and obviates the problem of degraded imaging quality of the LCD caused by the temperature rise of the light sources.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF THE INVENTION

The present disclosure is more particularly described in the following examples that are intended as illustrative only since numerous modifications and variations therein will be apparent to those skilled in the art.

Figure 1:
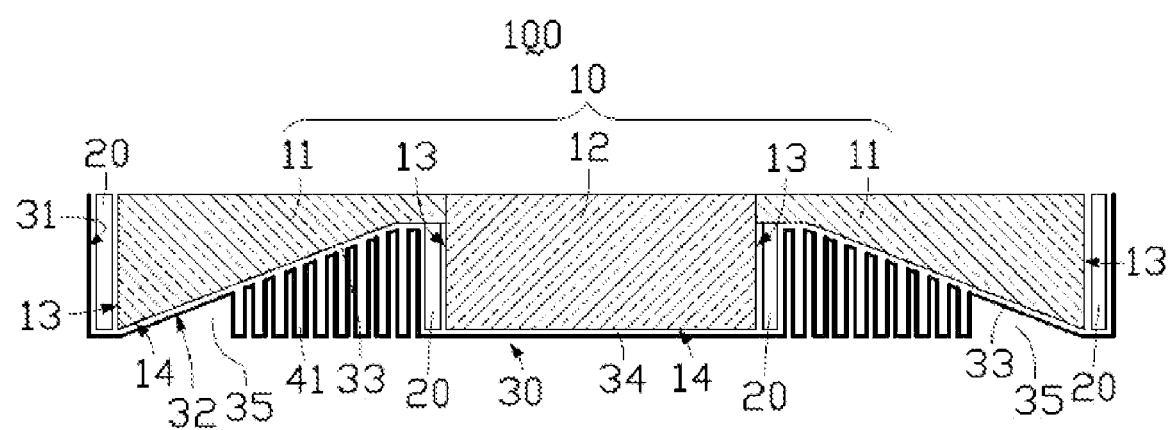
FIG. 1 is a schematic structural view of a first embodiment of an edge-lit backlight device according to the present disclosure.

Referring to FIG. 1, there is shown a schematic structural view of a first embodiment of an edge-lit backlight device according to the present disclosure. The edge-lit backlight device 100 comprises a light guide plate 10, light sources 20, a backplate 30 and heat dissipating elements 41.

The light guide plate 10 comprises a rectangular plate portion 12 and two wedged plate portions 11 disposed at two sides of the rectangular plate portion 12 respectively. Each of the wedged plate portions 11 has a larger thickness at a side away from the rectangular plate portion 12. The wedged plate portions 11 and the rectangular plate portion 12 each comprise a light incident surface 13 and a bottom surface 14.

The light sources 20 are disposed adjacent to the light incident surfaces 13 of the wedged plate portions 11 and the rectangular plate portion 12 respectively. In this embodiment, a plurality of light emitting diodes (LEDs) or cold cathode fluorescent lamps (CCFLs) may be used as the light sources 20.

The backplate 30 is disposed at an exterior side of the light guide plate 10, and encloses the light incident surfaces and the bottom surfaces 14 of the light guide plate 10. The backplate 30 comprises an inner surface 31 and an outer surface 32. The inner surface 31 of the backplate 30 is disposed adjacent to the light incident surfaces 13, the bottom surfaces 14 and other exterior side surfaces of the wedged plate portions 11 and the rectangular plate portion 12 respectively to support the wedged plate portions 11 and the rectangular plate portion 12. The inner surface 31 of the backplate 30 is further provided with a reflective coating or a reflective sheet to enhance the reflecting effect thereof.

In this embodiment, two protrusions apart from each other protrude upwards from the bottom of the backplate 30 at locations corresponding to the wedged plate portions 11 respectively to define a substantially right-triangular recessed region 35 below each of the protrusions. Meanwhile, a rectangular groove 34 and two wedged grooves 33 disposed at two sides of the rectangular groove 34 respectively are formed at an interior side of the backplate 30. Each of the wedged grooves 33 has a larger thickness at a side away from the rectangular groove 34. Dimensions of the wedged grooves 33 and the rectangular groove 34 are slightly greater than those of the wedged plate portions 11 and the rectangular plate portion 12 respectively. The two wedged plate portions 11 and the rectangular plate portion 12 are disposed in the two wedged grooves 33 and the rectangular groove 34 respectively. Light sources 20 are disposed in the two wedged grooves 33 at locations adjacent to the light incident surfaces 13 of the two wedged plate portions 11 and the rectangular plate portion 12 respectively.

The heat dissipating elements 41 are disposed in the recessed regions 35 below the protrusions respectively, and the heat dissipating elements 41 and the light guide plate 10 are located at two opposite sides of the backplate 30 respectively. In this embodiment, each of the heat dissipating elements 41 comprises a plurality of heat dissipating fins disposed on the outer surface 32 of the backplate 30 adjacent to the recessed region 35 and at a uniform interval. The outer surface 32 is an inclined surface, and the heat dissipating fins are disposed adjacent to the light incident surface 13 of the rectangular plate portion 12 and extend from the outer surface 32 downwards to be flush with the bottom surface 14 of the rectangular plate portion 12. The heat dissipating fins are arranged in a direction perpendicular to a light emitting direction of the corresponding light source 20. Of course, the heat dissipating fins may also be arranged in a direction parallel to or inclined relative to the light emitting direction of the corresponding light source 20 depending on design requirements of the product. Further, the heat dissipating fins may be integrally formed on the backplate 30 through a bending process; i.e., a portion of the backplate 30 corresponding to each of the recessed regions 35 is bent upwards and downwards to form heat dissipating fins of a wavy structure. The heat dissipating fins can increase the heat dissipating area of the backplate 30 so that the heat generated by the corresponding light source 20 can be dissipated outwards timely. This can prolong the service life of the light source 20 and prevent occurrence of the reddish color of the liquid crystal display panel (not shown) near the light source 20 due to the temperature rise of the light source 20, thereby improving the displaying quality. Furthermore, the heat dissipating fins further improves the mechanical strength of the backplate 30, which helps to protect the light guide plate 10 and the light source 20.

Figure 2:
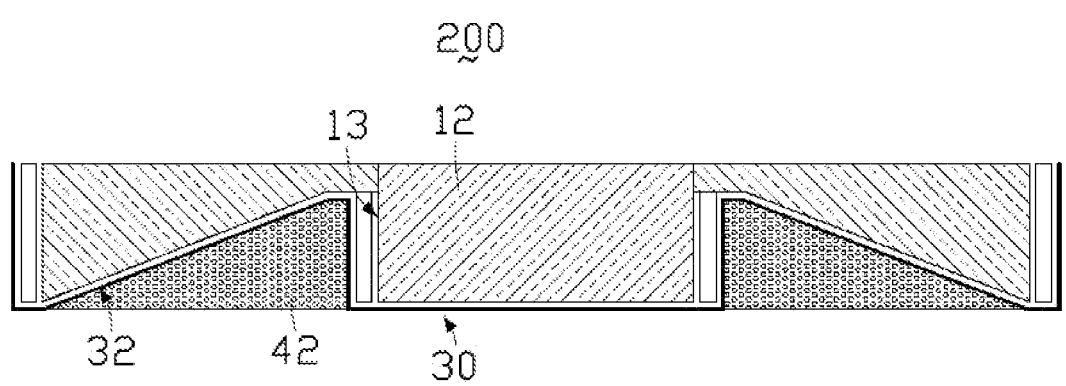
FIG. 2 is a schematic structural view of a second embodiment of the edge-lit backlight device according to the present disclosure.

Referring to FIG. 2, there is shown a schematic structural view of a second embodiment of the edge-lit backlight device according to the present disclosure. The edge-lit backlight device 200 of this embodiment is substantially the same as the edge-lit backlight device 100 of the first embodiment except that: each of the heat dissipating elements 42 of the edge-lit backlight device 200 is a heat dissipating layer filled into the corresponding recessed region 35. The heat dissipating layer is attached onto the outer surface 32 of the backplate 30, and is wedge-shaped because a thickness thereof decreases as a distance from the light incident surface 13 of the rectangular plate portion 12 increases.

Figure 3:
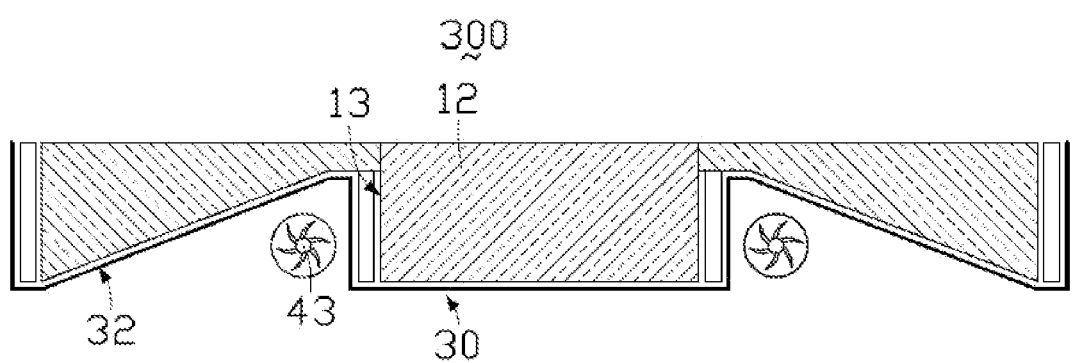
FIG. 3 is a schematic structural view of a third embodiment of the edge-lit backlight device according to the present disclosure.

Referring to FIG. 3, there is shown a schematic structural view of a third embodiment of the edge-lit backlight device according to the present disclosure. The edge-lit backlight device 300 of this embodiment is substantially the same as the edge-lit backlight device 100 of the first embodiment except that: each of the heat dissipating elements 43 of the edge-lit backlight device 300 is a fan disposed near the outer surface 32 of the backplate 30 and adjacent to the light incident surface 13 of the rectangular plate portion 12.

Figure 4:
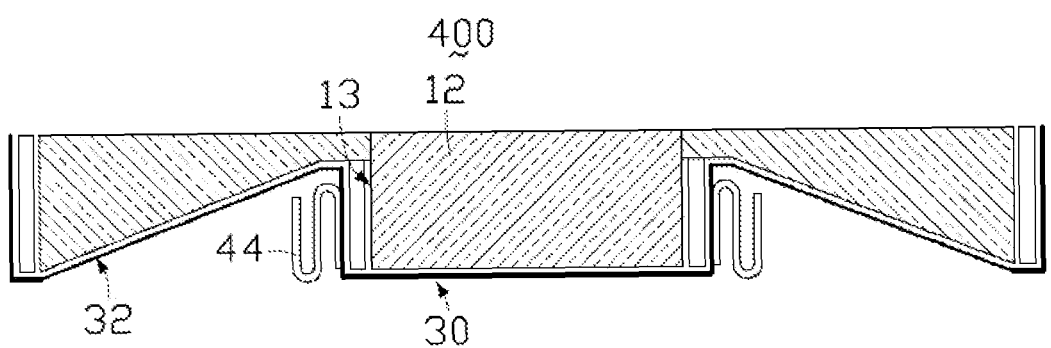
FIG. 4 is a schematic structural view of a fourth embodiment of the edge-lit backlight device according to the present disclosure.

Referring to FIG. 4, there is shown a schematic structural view of a fourth embodiment of the edge-lit backlight device according to the present disclosure. The edge-lit backlight device 400 of this embodiment is substantially the same as the edge-lit backlight device 100 of the first embodiment except that: each of the heat dissipating elements 44 of the edge-lit backlight device 400 is a heat pipe disposed near the outer surface 32 of the backplate 30 and adjacent to the light incident surface 13 of the rectangular plate portion 12.

The present disclosure further provides a liquid crystal display (LCD) which comprises one of the edge-lit backlight devices described in the above embodiments.

The present disclosure has the following benefits: as compared to the prior art, the edge-lit backlight device is simple in structure, allows for regional control functions and can dissipate heat generated by the light sources in a timely and efficient way. This prolongs the service life of the light sources and obviates the problem of degraded imaging quality of the LCD caused by the temperature rise of the light sources.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An edge-lit backlight device, comprising a light guide plate, light sources and a backplate, wherein:
the light guide plate comprises two wedged plate portions and a rectangular plate portion, the two wedged plate portions are disposed at two sides of the rectangular plate portion respectively, each of the wedged plate portions has a larger thickness at a side away from the rectangular plate portion, and the wedged plate portions and the rectangular plate portion each comprise a light incident surface and a bottom surface;
the light sources are disposed adjacent to the light incident surfaces of the wedged plate portions and the rectangular plate portion respectively;
the backplate comprises an inner surface and an outer surface, two protrusions spaced apart from each other protrude from a bottom of the backplate at locations corresponding to the wedged plate portions, a recessed region is defined below each of the protrusions, a rectangular groove and two wedged grooves disposed at two sides of the rectangular groove respectively are formed at an inner side of the backplate, and the wedged plate portions and the rectangular plate portion are disposed in the two wedged grooves and the rectangular groove respectively; and
the edge-lit backlight device further comprises heat dissipating elements disposed in the recessed regions respectively, and the heat dissipating elements and the light guide plate are located at two opposite sides of the backplate respectively.

2. The edge-lit backlight device of claim 1, wherein each of the heat dissipating elements is a plurality of heat dissipating fins disposed apart from each other on the outer surface of the backplate adjacent to one of the recessed regions, the outer surface of the backplate is an inclined surface, and the heat dissipating fins extend from the outer surface downwards to be flush with the bottom surface of the rectangular plate portion.

3. The edge-lit backlight device of claim 1, wherein each of the heat dissipating elements is a heat pipe disposed near the outer surface of the backplate and adjacent to the light incident surface of the rectangular plate portion.

4. The edge-lit backlight device of claim 1, wherein the two wedged plate portions respectively abut the two opposite sides of the rectangular plate portion.

5. An edge-lit backlight device, comprising a light guide plate, light sources and a backplate, wherein:
the light guide plate comprises two wedged plate portions and a rectangular plate portion, the two wedged plate portions are disposed at two sides of the rectangular plate portion respectively, each of the wedged plate portions has a larger thickness at a side away from the rectangular plate portion, and the wedged plate portions and the rectangular plate portion each comprise a light incident surface and a bottom surface;
the light sources are disposed adjacent to the light incident surfaces of the wedged plate portions and the rectangular plate portion respectively;

the backplate is disposed at an exterior side of the light guide plate and comprises an inner surface and an outer surface;

wherein two protrusions spaced apart from each other protrude from a bottom of the backplate at locations corresponding to the wedged plate portions, and a recessed region is defined below each of the protrusions and the edge-lit backlight device further comprises heat dissipating elements, and the heat dissipating elements and the light guide plate are located at two opposite sides of the backplate respectively.

6. The edge-lit backlight device of claim 5, wherein each of the heat dissipating elements is a plurality of heat dissipating fins disposed apart from each other on the outer surface of the backplate adjacent to one of the recessed regions, the outer surface of the backplate is an inclined surface, and the heat dissipating fins extend from the outer surface downwards to be flush with the bottom surface of the rectangular plate portion.

7. The edge-lit backlight device of claim 6, wherein the heat dissipating fins are formed integrally on each of the protrusions of the backplate and are bent upwards and downwards into a wavy form.

8. The edge-lit backlight device of claim 5, wherein each of the heat dissipating elements is a heat dissipating layer filled in one of the recessed regions, and a thickness of the heat dissipating layer decreases as a distance from the light incident surface of the rectangular plate portion increases.

9. The edge-lit backlight device of claim 5, wherein each of the heat dissipating elements is a fan disposed near the outer surface of the backplate and adjacent to the light incident surface of the rectangular plate portion.

10. The edge-lit backlight device of claim 5, wherein each of the heat dissipating elements is a heat pipe disposed near the outer surface of the backplate and adjacent to the light incident surface of the rectangular plate portion.

11. The edge-lit backlight device of claim 5, wherein the two wedged plate portions respectively abut the two opposite sides of the rectangular plate portion.

12. A liquid crystal display (LCD) comprising an edge-lit backlight device, the edge-lit backlight device comprising a light guide plate, light sources and a backplate, wherein:

the light guide plate comprises two wedged plate portions and a rectangular plate portion, the two wedged plate portions are disposed at two sides of the rectangular plate portion respectively, each of the wedged plate portions has a larger thickness at a side away from the rectangular plate portion, and the wedged plate portions and the rectangular plate portion each comprise a light incident surface and a bottom surface;

the light sources are disposed adjacent to the light incident surfaces of the wedged plate portions and the rectangular plate portion respectively;

the backplate is disposed at an exterior side of the light guide plate and comprises an inner surface and an outer surface;

wherein two protrusions spaced apart from each other protrude from a bottom of the backplate at locations corresponding to the wedged plate portions, and a recessed region is defined below each of the protrusions;

and the edge-lit backlight device further comprises heat dissipating elements, and the heat dissipating elements and the light guide plate are located at two opposite sides of the backplate respectively.

13. The LCD of claim 12, wherein each of the heat dissipating elements is a plurality of heat dissipating fins disposed apart from each other on the outer surface of the backplate adjacent to one of the recessed regions, the outer surface of the backplate is an inclined surface, and the heat dissipating fins extend from the outer surface downwards to be flush with the bottom surface of the rectangular plate portion.

14. The LCD of claim 13, wherein the heat dissipating fins are arranged in a direction parallel to a light emitting direction of a corresponding one of the light sources.

15. The LCD of claim 13, wherein the heat dissipating fins are formed integrally on each of the protrusions of the backplate and are bent upwards and downwards into a wavy form.

16. The LCD of claim 12, wherein each of the heat dissipating elements is a heat dissipating layer filled in one of the recessed regions, and a thickness of the heat dissipating layer decreases as a distance from the light incident surface of the rectangular plate portion increases.

17. The LCD of claim 16, wherein the heat dissipating layer is wedge-shaped.

18. The LCD of claim 12, wherein the two wedged plate portions respectively abut the two opposite sides of the rectangular plate portion.

* * * * *